United States Patent [19]
Seitzer

[11] 3,901,669
[45] Aug. 26, 1975

[54] MANUFACTURE OF HYDROGEN FROM HIGH TEMPERATURE STEAM

[75] Inventor: Walter H. Seitzer, West Chester, Pa.

[73] Assignee: Sun Ventures, Inc., St. Davids, Pa.

[22] Filed: Nov. 5, 1973

[21] Appl. No.: 412,999

[52] U.S. Cl. .................................................. 55/16
[51] Int. Cl.² ........................................ B01D 53/22
[58] Field of Search ............... 23/281; 55/16, 158; 423/576, 644, 648

[56] References Cited
UNITED STATES PATENTS

| | | | |
|---|---|---|---|
| 3,241,293 | 3/1966 | Pfefferle | 55/16 |
| 3,278,268 | 10/1966 | Pfefferle | 23/281 |
| 3,699,032 | 10/1972 | Rapp | 55/16 |

OTHER PUBLICATIONS

Mellon's, "Comprehensive Treatise on Inorganic and Theretical Chemistry," Vol. 1, pp. 491–493.

Primary Examiner—Charles N. Hart
Attorney, Agent, or Firm—George L. Church; Donald R. Johnson; Paul Lipsitz

[57] ABSTRACT

A process for preparing hydrogen from steam dissociated into hydrogen and oxygen by heating it at a temperature above 1,500°C., passing the dissociated steam through a first chamber having a wall in common with a second chamber, which common wall is permeable to oxygen, and cooling the gaseous effluent from said first chamber to yield a hydrogen rich stream.

5 Claims, 1 Drawing Figure

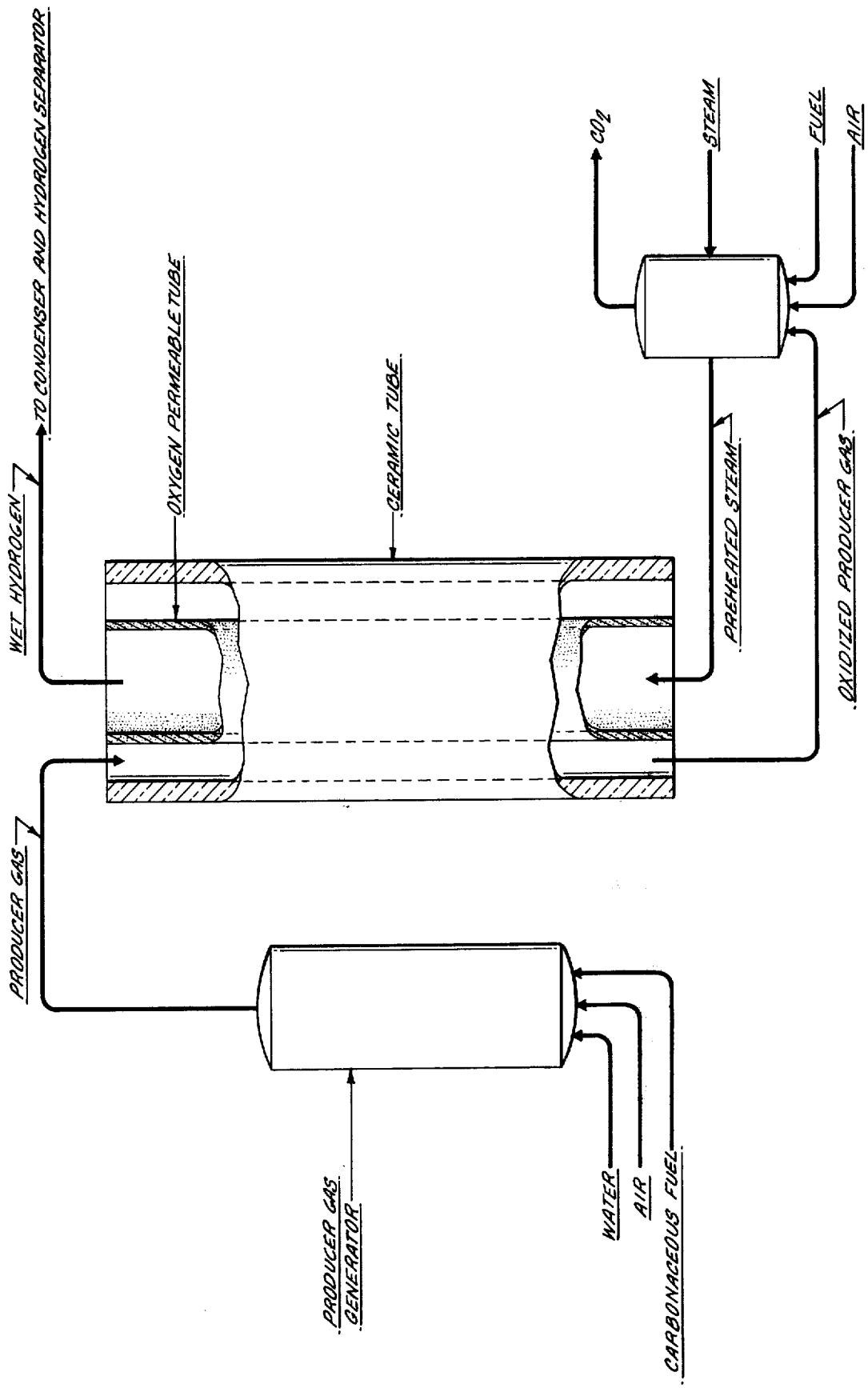

MANUFACTURE OF HYDROGEN FROM HIGH TEMPERATURE STEAM

Hydrogen is a commercially important industrial commodity and is considered by the technically knowledgeable to be a possible universal source of nonpolluting energy. Accordingly, improved processes for hydrogen manufacture are of great significance to our high energy consuming universe. The present invention provides a simple, easily controlled, low cost process for hydrogen using water as the hydrogen source.

In accord with the invention, steam is dissociated into hydrogen and oxygen by heating it to a temperature above 1,500°C. and the dissociated steam passed through a first chamber having a wall in common with a second chamber, which common wall is permeable to oxygen and through which the oxygen from the dissociated steam passes, and cooling the gaseous effluent from said first chamber to yield a hydrogen rich stream.

It will be understood that the dissociation of the steam used in the process may be made externally or within the first chamber having the oxygen permeable common wall. Preferably, however, the actual steam dissociation will be made to occur within the first chamber and this is readily accomplished by preheating the steam in a separate furnace and thereafter passing it into the first chamber which will be held at a temperature between above 1,500°C. to about 2,500°C., preferably about 2,200°C., most preferably about 2,000°C.

It will also be understood that the configuration of the first and second chambers having a common oxygen permeable wall may take several equivalent forms. For example, two adjacent channels sharing a wall and each channel having a square or rectangular cross-section may be used, but, preferably, two concentric tubes readily provide the two required chambers for the process of the invention. In such an arrangement the inside of the inner tube provides the first chamber, the wall of the inner tube being the common wall separating the first chamber from the second chamber which is the space between the wall of the inside tube and the wall of the outer tube. In order to obtain the necessary oxygen permeable wall, construction materials will be used which will withstand the required temperature; e.g., refractory oxides such as zirconia, lanthana, ceria and the like. In the preferred construction a zirconia tube is simply placed within a ceramic tube (such as mullite or alundum) to obtain the required apparatus. It is also possible to use bundles of zirconia tubes in a vessel lined with thick zirconia brick or other equivalent materials.

It is also advantageous in carrying out the process of the invention to sweep the second chamber into which oxygen permeates with a gas in order to rapidly remove the oxygen and thus act as a driving force for continual permeation of oxygen to the second chamber. Any type of oxygen reactive or nonreactive gas may be used for this purpose and useful gases included nitrogen, carbon dioxide, carbon monoxide, hydrogen, methane, and other hydrocarbon gases and the like. Preferably a reducing gas will be used as this will further enhance oxygen removal by chemical reaction as well as by physical removal and thus the first chamber will be of very high hydrogen content. In a preferred process, producer gas made by reacting a carbonaceous feed with air and steam will be passed through the second chamber and the oxygen therein will react with it to provide a gaseous fuel for the steam preheater. Such a procedure is shown in the drawing where steam is fed to a preheater section to heat steam which is passed into the first chamber of a concentric tubular reactor having a zirconia inner tube and held at 2,000°C. Producer gas, generated from a carbonaceous fuel (e.g., coal, methane, etc.), air and steam contain $N_2$, $CO$, $H_2$, $CO_2$ and $H_2O$ is passed through the second chamber where the oxygen which has permeated through the common wall from the first chamber reacts with the CO to produce $CO_2$. This oxidized producer gas then is used to supplement the heat energy required to preheat the steam.

The wet effluent steam from the steam dissociation reactor contains hydrogen in high concentration and this stream is simply passed into a condenser to remove water and the hydrogen gas present is collected by water displacement or other means.

In order to further illustrate the invention the following examples are given.

EXAMPLE 1

Into a gas-fired oven is placed a mullite tube with inside diameter one-quarter inch, and a zirconia tube three-sixteenths inch O.D. with a one thirty-seconds inch wall thickness is inserted into the mullite tube. The tube length inside the furnace is about 3 feet.

Ten grams per hour of water is preheated to 1,000°C in another furnace and introduced into the inner tube. Hydrogen gas is passed through the space between the inner and outer tubes. The temperature of these tubes is maintained by the gas-fired furnace at about 2,000°C.

The stream exiting from the inner tube is passed into a condenser to remove most of the water and hydrogen gas is collected by water displacement. Over a period of 1 hour, 2.5 liters of hydrogen are accumulated.

EXAMPLE 2

A similar experiment is performed using carbon monoxide instead of hydrogen in the outer tube. Over a period of 1 hour, 1.8 liters of hydrogen are made from steam flowing through the inner zirconia tube.

The invention claimed is:

1. A process for preparing hydrogen from steam which comprises dissociating steam into hydrogen and oxygen by heating at a temperature above 1,500°C., passing the dissociated steam through a first chamber having a wall in common with a second chamber, which common wall is a refractory oxide permeable to oxygen and through which oxygen from the dissociated steam diffuses at a temperature above 1,500°C., sweeping said second chamber with a gas to remove said permeated oxygen, and cooling the gaseous effluent from said first chamber to yield a hydrogen rich stream.

2. A process for preparing hydrogen from steam which comprises dissociating steam into hydrogen and oxygen by heating it at a temperature between about 2,000°C. and about 2,200°C. to effect dissociation, passing the dissociated steam through a first chamber having a wall of a refractory oxide in common with a second chamber, said wall being permeable to oxygen and through which the oxygen from the dissociated steam passes at a temperature of said steam dissociation, sweeping the second chamber with a reducing gas, cooling the gaseous effluent from said first chamber to condense water, and separating a hydrogen rich stream.

3. The process of claim 2 where the refractory oxide common wall is zirconia.

4. The process of claim 2 where the reducing gas is producer gas.

5. The process of claim 3 where the oxidized producer gas is used as a source of fuel in a preheater for said steam.

* * * * *